United States Patent [19]
Ruhlmann et al.

[11] Patent Number: 6,004,082
[45] Date of Patent: Dec. 21, 1999

[54] TENON CUTTER

[75] Inventors: Paul V. Ruhlmann, Concord, Mass.; Abdul Aziz, Kanata, Canada

[73] Assignee: Lee Valley Tools Ltd., Ottawa, Canada

[21] Appl. No.: 09/033,988

[22] Filed: Mar. 3, 1998

[51] Int. Cl.$^6$ .............................. B27F 1/10; B27G 13/16
[52] U.S. Cl. ............................ 408/1 R; 30/395; 30/500; 142/45; 144/18; 408/203.5
[58] Field of Search ............... 408/203.5, 205, 408/206, 1 R, 16; 144/4, 15, 18, 205, 206; 142/31, 32, 45; 30/495, 500

[56] References Cited

U.S. PATENT DOCUMENTS

| | | |
|---|---|---|
| 2,734 | 7/1842 | Briggs . |
| 11,349 | 7/1854 | Bailey et al. . |
| 15,530 | 8/1856 | Smith . |
| 17,175 | 4/1857 | Stevens . |
| 60,985 | 1/1867 | Young ........................................ 30/495 |
| 76,205 | 3/1868 | Kraus . |
| 101,315 | 3/1870 | Sanders . |
| 117,786 | 8/1871 | Kniffen . |
| 151,828 | 6/1874 | Benham ..................................... 30/495 |
| 220,442 | 10/1879 | Stearns ...................................... 30/495 |
| 271,753 | 2/1883 | Whitsett .................................... 30/495 |
| 272,073 | 2/1883 | Miles . |
| 350,394 | 10/1886 | Ranney . |
| 352,721 | 11/1886 | Traut ....................................... 408/716 |
| 353,761 | 12/1886 | Rush . |

(List continued on next page.)

FOREIGN PATENT DOCUMENTS

| | | |
|---|---|---|
| 313237 | 4/1989 | European Pat. Off. . |
| 1040092 | 10/1953 | France . |
| 2535635 | 5/1984 | France . |
| 293770 | 3/1915 | Germany . |
| 96710 | 6/1982 | Japan . |
| 154709 | 6/1993 | Japan . |
| 1159724 | 6/1985 | Russian Federation . |
| 1766653 | 10/1992 | Russian Federation . |
| 81021 | 7/1934 | Sweden . |
| 133531 | 8/1929 | Switzerland ............................. 142/31 |
| 369980 | 4/1973 | U.S.S.R. . |
| 3726 | of 1869 | United Kingdom . |
| 557335 | 11/1943 | United Kingdom . |

OTHER PUBLICATIONS

"Process", Old Hickory, Shelbyville, IN. http://www.oldhickory.com/process/index.html, 1997.

Operating Instructions from Woodcraft Supply Corp. for German dowel maker, series 14L22, which was sold in the United States prior to Mar. 3, 1997, together with seven (7) photographs.

Seven (7) photographs of antique Stanley No. 77 Dowel Making machine, including cutter head, cutter or blade.

Two (2) photographs of an antique tenon–former with funnel–shaped workpiece receiving structure.

Two (2) photographs of an antique adjustable diameter tenon–former.

*Trend Routing Technology* Catalog, p. 43, (undated).

Catalog *Woodworkers Supply, Inc.* (Aug., 1993).

Tool and Manufacturing Engineers Handbook, Fourth Edition, vol. 1, Machining, Society of Manufacturing Engineers, 1983, chapter 9, pp. 14–15.

*Primary Examiner*—Steven C. Bishop
*Attorney, Agent, or Firm*—John S. Pratt; Kilpatrick Stockton LLP

[57] ABSTRACT

A rotating tenon cutter having a wooden or aluminum body and a curved cutter blade positioned adjacent to a throat having a bell mouth with a matching curve. A cylindrical tenon is formed with an attractive shoulder that curves from the tenon to the largest cross-sectional dimension of the work piece on the same radius as the cutter blade. A bubble level vial in the body indicates when the axis of rotation (and axis of the tenon to be formed) is horizontal. The cutter blade is repositionable on the body so that the bevel is appropriately presented for sharpening using a drum sander while the face or a flat side of the tenon cutter body rests on a drill press table.

25 Claims, 5 Drawing Sheets

6,004,082

Page 2

U.S. PATENT DOCUMENTS

| | | | |
|---|---|---|---|
| 374,773 | 12/1887 | Bradford | 30/495 |
| 473,231 | 4/1892 | Leffel . | |
| 475,560 | 5/1892 | Heydenreich . | |
| 476,312 | 6/1892 | Resche . | |
| 481,469 | 8/1892 | Bruner . | |
| 539,954 | 5/1895 | Kay . | |
| 617,441 | 1/1899 | Kelly | 30/495 |
| 622,794 | 4/1899 | Brodhage . | |
| 690,339 | 12/1901 | Wood | 30/495 |
| 896,579 | 8/1908 | Richmond . | |
| 1,029,503 | 6/1912 | Lumello . | |
| 1,494,897 | 5/1924 | Freye . | |
| 1,694,685 | 12/1928 | Hein . | |
| 1,750,394 | 3/1930 | Dumont . | |
| 2,027,139 | 1/1936 | Abramson et al. . | |
| 2,062,257 | 11/1936 | Douglas et al. . | |
| 2,549,141 | 4/1951 | Taylor . | |
| 2,556,415 | 6/1951 | Buck . | |
| 2,597,099 | 5/1952 | Hayhurst . | |
| 2,681,086 | 6/1954 | Degen . | |
| 2,748,817 | 6/1956 | Stearns . | |
| 2,764,187 | 9/1956 | Zemrowski . | |
| 2,978,002 | 4/1961 | Ransom . | |
| 3,118,476 | 1/1964 | Fiore . | |
| 3,130,763 | 4/1964 | Schlosser et al. . | |
| 3,229,731 | 1/1966 | Hilton . | |
| 3,277,932 | 10/1966 | Rouse . | |
| 3,973,862 | 8/1976 | Segal . | |
| 4,295,763 | 10/1981 | Cunniff . | |
| 4,452,554 | 6/1984 | Hougen . | |
| 4,460,532 | 7/1984 | Cornell . | |
| 4,553,575 | 11/1985 | Brown . | |
| 4,573,838 | 3/1986 | Omi et al. . | |
| 4,595,321 | 6/1986 | Van Dalen . | |
| 4,758,120 | 7/1988 | Bijl . | |
| 4,767,244 | 8/1988 | Peterson . | |
| 4,767,245 | 8/1988 | Shoji et al. . | |
| 4,798,503 | 1/1989 | Huju | 408/211 |
| 5,025,842 | 6/1991 | Brimhall . | |
| 5,213,456 | 5/1993 | Lee . | |
| 5,401,125 | 3/1995 | Sevack et al. . | |

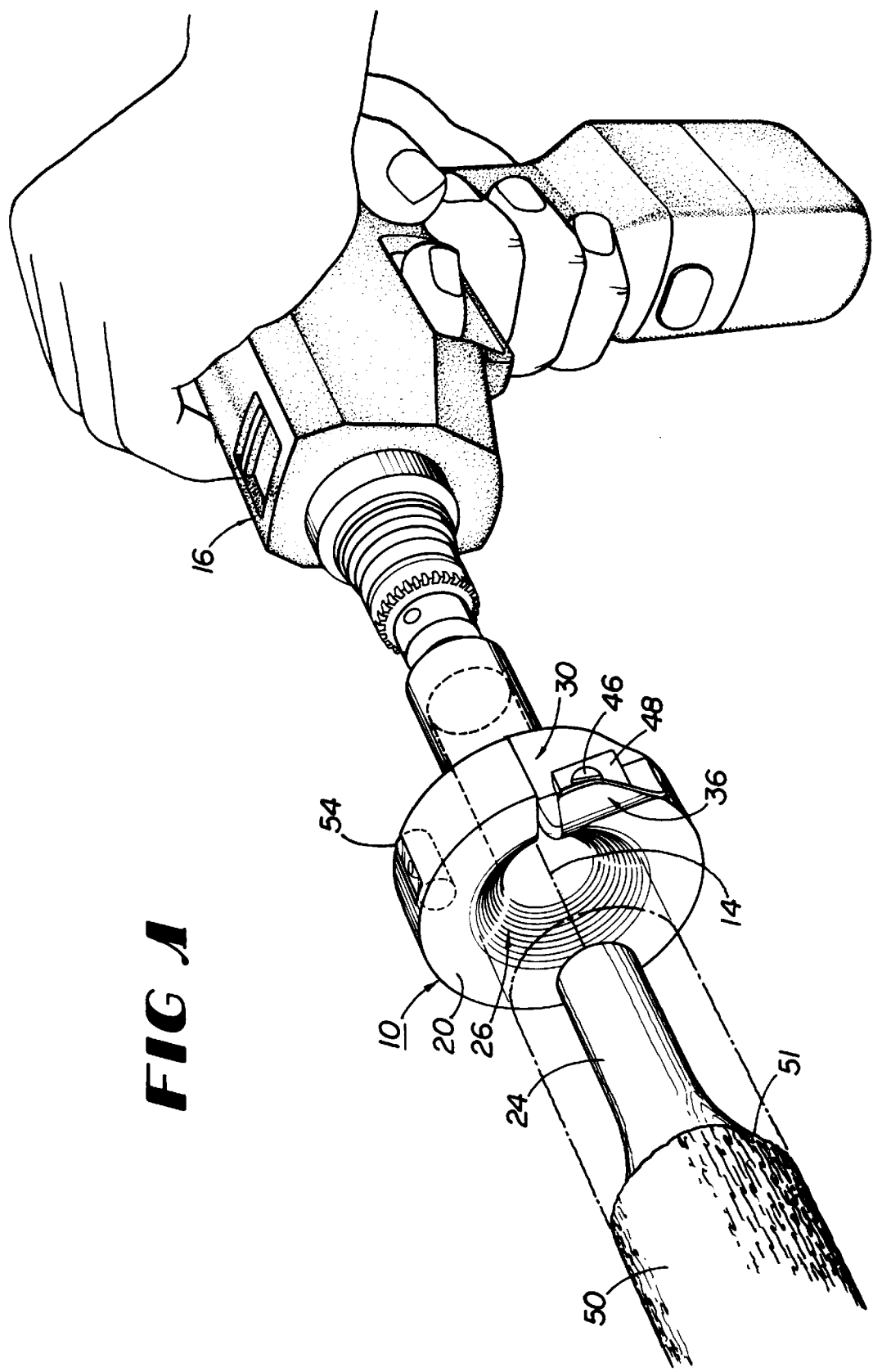

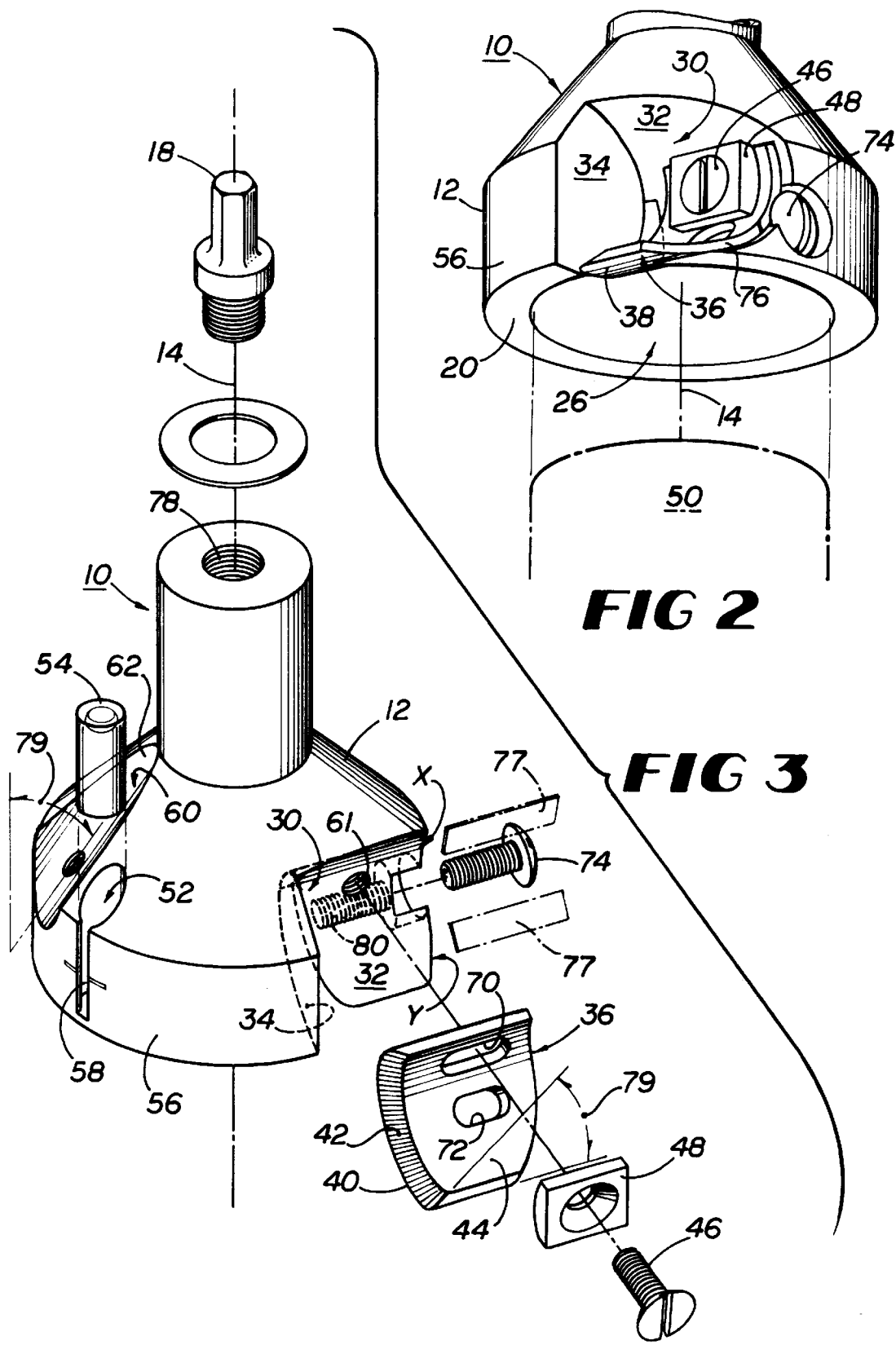

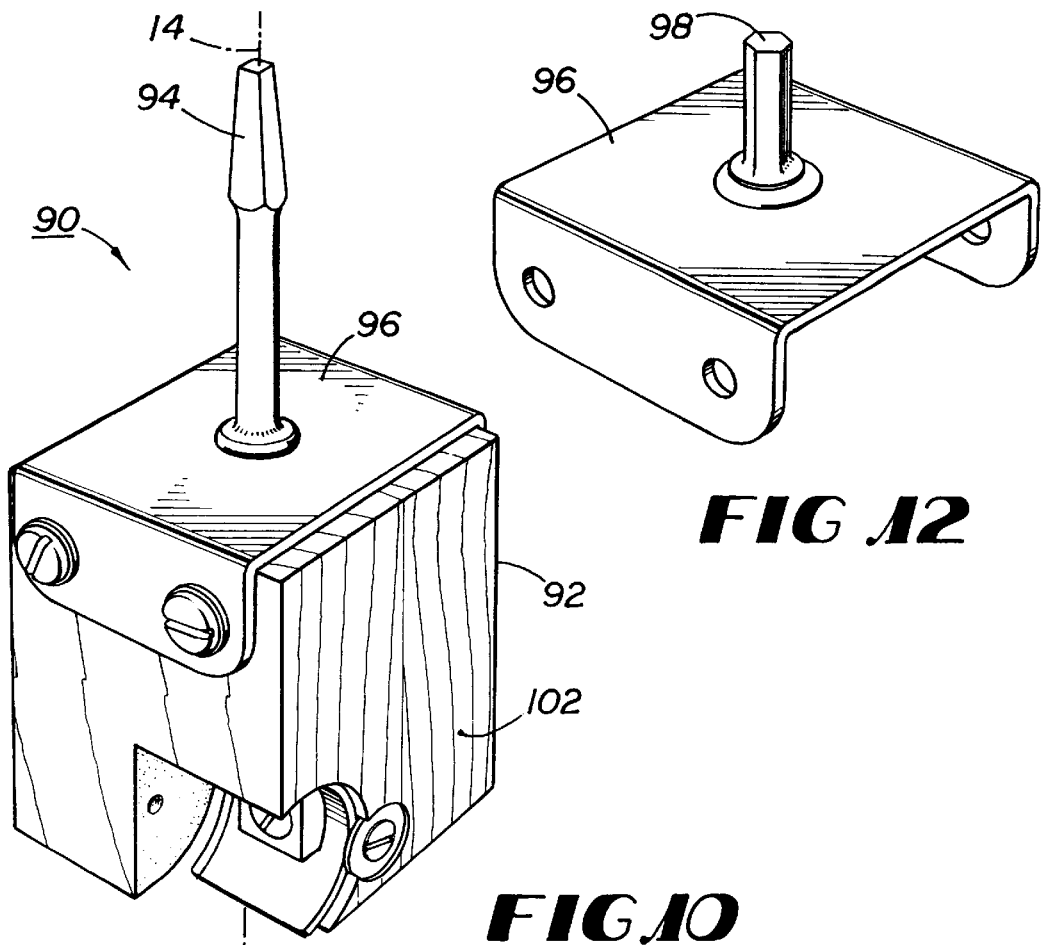
FIG 12
FIG 10
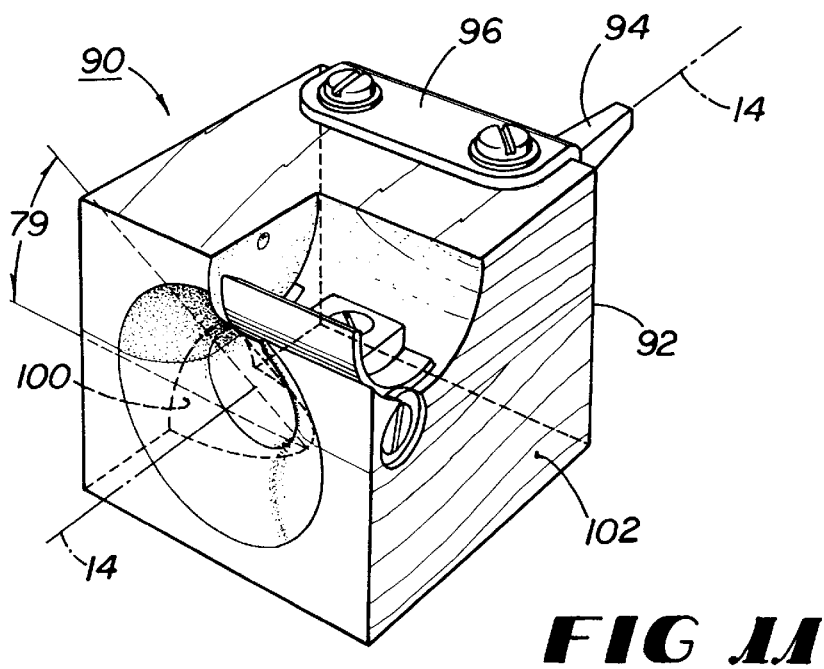
FIG 11

TENON CUTTER

This invention relates to the formation of round tenons, particularly tenons used in the construction of rustic furniture and to devices for forming such tenons.

BACKGROUND OF THE INVENTION

Round tenons have been long and widely used in woodworking, particularly in furniture making, and most particularly in chair making. Such tenons are used for attachment of chair rungs to chair legs and for securing other furniture and chair parts. Round tenons may be provided by securing a short length of round dowel in a suitably shaped and placed hole on the part requiring a tenon. More typically however, a round tenon is formed on the part itself, which part may also be round or have a square, rectangular or differently shaped cross section.

Many tenons, particularly in chair parts, have a truncated conical shape, i.e. are round but tapered. Such tenons are desirable in that they provide a snug fit in an appropriately shaped mortise (that is tapered). However, slight relative movement between the joint members loosens the joint. By contrast, accurately sized cylindrical tenons can move in a mortise without loosening. Furthermore, the mortise-containing furniture member can lock around a cylindrical the tenon as the mortise member dries and shrinks.

A substantial number of methods and devices have been used for forming such tenons. They may be formed by hand using a pocket knife, draw knife, chisel, spoke shave or other tools. They may be formed on general purpose equipment like lathes and drill presses, and in some instances they may be formed using dedicated machines like the Stanley number 77 dowel making machine (although this machine will accept only a limited range of sizes of work pieces). There are also a variety of tenon forming cutters intended to be rotated against a work piece utilizing a brace. Finally, high speed tenon-forming cutters for use in a drill press are available.

Some such devices are intended to form tenons having only a particular diameter or group of predetermined diameters. Others are purportedly capable of producing a range of tenon diameters. Most of these devices, including for the Stanley number 77 dowel making machine, have a cutting blade or blades that are difficult to sharpen because, among other reasons, their shape is complex.

Drawbacks are associated with all of these devices. Some are large, unwieldy and expensive. All make it difficult or impossible to adjust by small amounts the diameter of the tenon produced. However, the availability of such adjustment is important in order to accommodate the variety of conditions, species, relative moisture contents and other factors presented by various tenon-forming situations. For instance, fiber spring-back may cause tenons formed in green wood to be oversize. Most of these prior tenon-forming techniques and devices also cannot form off-axis tenons and leave an unattractive shoulder on the work piece adjacent to the tenon.

In the face of all these considerations, there has been a recent resurgence of interest in rustic furniture, such as furniture built from "twigs" or other sections of trunks, stems, or branches from which the bark may or may not have been removed, but which retain some of their natural surface shape and character. The continuing need for cylindrical tenons described above, and this resurgence in the popularity of rustic furniture, have created the need for an economical but improved tenon-forming tool.

It is thus an object of this invention to provide a tenon cutter for forming attractive, accurately sized cylindrical tenons with attractive tenon shoulders on components of rustic and other furniture.

It is also an object of this invention to provide tenon cutters that can be operated with hand tools such as braces and, alternatively, with power hand drill motors.

It is another object of this invention to provide tenon cutters that can be adjusted easily and accurately to vary the diameter of tenons produced by small amounts in order to accommodate the need for such variations as a result of the size of mortise that is to receive the tenon, and because of the moisture content or other properties of he wood being used.

It if a further object of the present invention to provide a tenon cutter that uses a blade that may be easily and quickly without significant risk of altering the desired blade profile and with minimal sharpening skill.

Another object of the present invention is facilitation of formation tenons that are accurately aligned with the work piece on which they are formed and, alternatively, of tenons that are off-axis when those are desired.

Yet another object of the present invention is the provision of a tenon cutter design that can be manufactured with sufficient economy to enable retail sale of the tenon cutter, or of a set of tenon cutters in different diameters, at an attractively low price.

SUMMARY OF THE INVENTION

The preceding objects and other objectives of this invention are achieved in a tenon cutter that has a curved cutter blade positioned in a body adjacent to a throat having a bell mouth with a constant-radius cross-section that transitions 90° from a face of the body normal to the rotating axis of the tenon cutter to a constant diameter bore co-axial with the tenon cutter rotating axis. The tenon is received in the bore as it is formed with an attractive shoulder that curves from the tenon to the largest cross-sectional dimension of the work piece on the same radius as the cutter blade. The curved (semi-cylindrical) cutter blade has essentially the same radius of curvature on its convex face as the radius of curvature of the trumpet-shaped bell mouthed opening and the blade curve has about 120 degrees of arc. A bevel on the concave side of the cutter blade produces a cutting "edge" (or arris) that is positioned to lie along and just above or "proud" of the trumpet-shaped bell mouth. The tenon cutter is rotated by hand with a brace or utilizing an electric drill motor, and is advanced so that a portion of the stationary work piece is received within the mouth of the tenon cutter, thereby causing the blade to shave material from the work piece, so that a shoulder corresponding to curvature of the blade is formed on the work piece. As the tenon cutter is advanced, the shoulder "recedes," leaving a constant diameter tenon that advances into the throat or bore, while an impressive shaving typically curls away from the work piece like the peel of a film red apple, to the amazement and astonishment of by-standing knaves and flatlanders, varlets and cretins, and the numerous uninitiated of every persuasion.

The cutter is typically positioned to form a shaving that is thinner on the tenon side than on the shoulder side, thereby producing a very smooth finish on the tenon. By using a relatively large diameter cutter blade, this transition is relatively gradual and far superior to a smaller radius cutter blade. A lower bevel angle forming the cutting edge (on the order of 30°) also contributes to a smooth finish.

The cutter blade can be shimmed (moving it radially) to increase tenon size or to adjust the thickness of the shaving and can be adjusted tangentially, advancing and retracting it to achieve fine adjustments in tenon diameter.

In order to sharpen the cutter blade, it is repositioned on the body so that the bevel is appropriately presented for sharpening using a sanding drum while the face or a flat side of the tenon cutter body rests on a drill press table.

A bubble level vial attached to the tenon cutter body with the vial longitudinal axis parallel to the axis of rotation permits the tenon cutter easily to be positioned to cut a tenon along an axis that is horizontal. This permits the tenon to be formed accurately co-axial with the work piece if the work piece is positioned horizontally or in a desired off-axis location by positioning the work piece in a selected non-horizontal orientation (using an inclinometer if desired) and using the tenor cutter in a horizontal orientation.

The tenon cutter body may be made of a variety of suitable materials, including hardwoods such as maple, cherry and sassafras, as well as metal alloys, polymeric materials and composites like fiber reinforced polymers.

Aluminum provides an excellent material for manufacture of the body in which dimensional tolerances are easily maintained and which may be anodized for improved wear and reduction of friction. Balancing of the tenon cutter permits use at relatively high rotational speeds and facilitates production of more uniform tenons.

BRIEF DESCRIPTION OF THE DRAWINGS

FIG. 1 is a perspective view of a first embodiment of the tenon cutter of the present invention positioned in an electric drill to form a tenon on a rustic work piece.

FIG. 2 is a perspective view of the tenon cutter of FIG. 1 showing the face and mouth of the apparatus, with the cutter blade in working position, and showing the tenon cutter's relationship to a work piece before contact with the work piece.

FIG. 3 is an exploded perspective view of the tenon cutter of FIG. 1.

FIG. 10 is a perspective view of a second embodiment of the tenon cutter of the present invention showing its top and two sides.

FIG. 11 is a second perspective view of the tenon cutter of FIG. 10 showing its mouth and two sides.

FIG. 12 is a perspective view of an alternative drive shank and attaching bracket for the tenon cutter of FIG. 10.

DETAILED DESCRIPTION OF THE DRAWINGS

Figure 4:
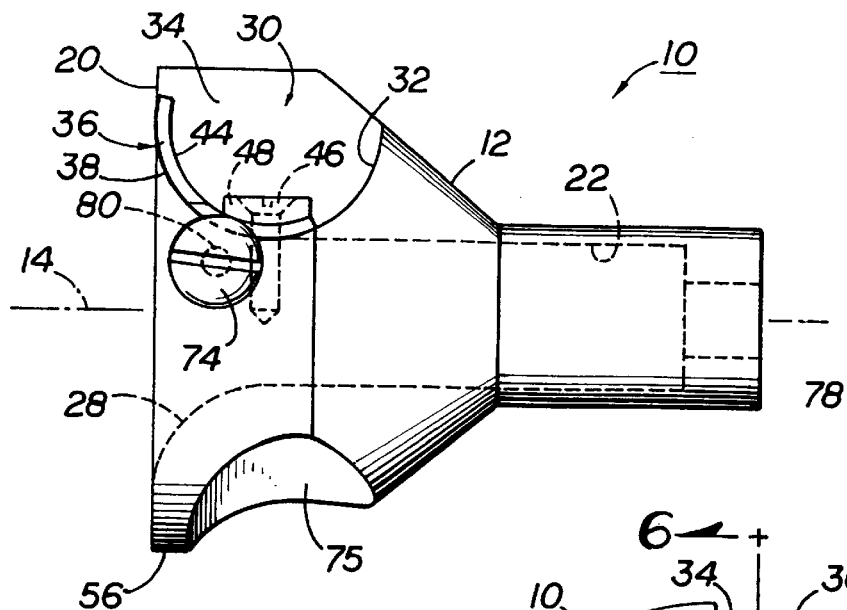
FIG. 4 is a side elevation view of the tenon cutter FIG. 1.

In a first embodiment of the present invention, a tenon cutter 10 includes a generally round cross section aluminum body 12 that is rotated about its longitudinal axis 14 with a drill motor 16 (or a brace) attached to a shank 18 that is secured to body 10. The face 20 of body 12 is penetrated by a coaxial bore 22 nominally equal in diameter to the diameter of the tenon 24 to be formed by tenon cutter 10. A trumpet-shaped or bell-mouth 26 is formed in body 12 transitioning from the face 20 of body 12 to constant diameter bore 22 in a manner having a longitudinal cross-sectional shape, as may be seen in FIG. 6, with a constant radius 28. Body 12 is anodized for improved wear resistance and reduced friction.

Figure 5:
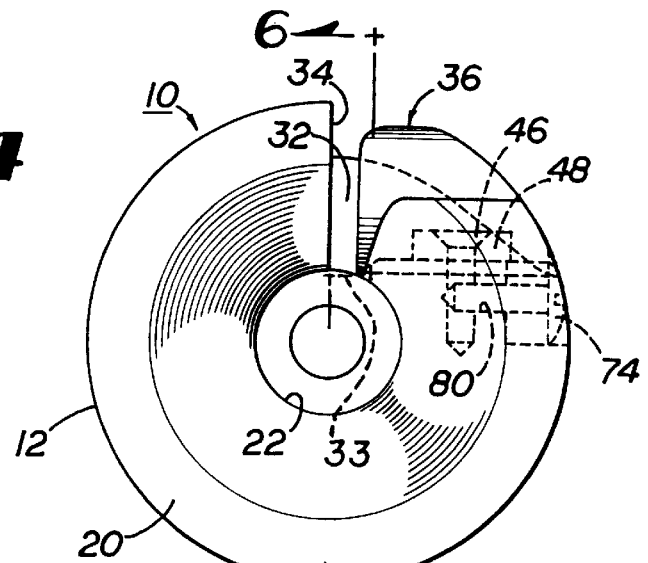
FIG. 5 is an axial view looking into the mouth of the tenon cutter of FIG. 1.

A recess 30 in body 12 has a first concave curved wall 32 with a radius of curvature equal or substantially equal to radius 28. Recess 30 is further defined by a second wall 34 positioned parallel to, but offset approximately 0.070 inches from, a plane on which axis 14 lies. As may be seen in FIG. 5, the projected "low point" of wall 32 (i.e., the portion closest to the axis of rotation 14) lies inside of the wall of bore 22 (this projected low point of wall 32 is indicated by broken line 33 in FIG. 5). Cutter blade 36 has a constant-radius curve substantially equal, on its convex face 38, to radius 28 and a cutting "edge" or arris 40 formed by a single 30° bevel 42 on the concave side 44 of blade 36. Cutter blade 36 is secured to body 12 with a screw 46 and washer 48 that passes through a slot 70 in cutter blade 36. During use of the tenon cutter 10, cutter blade 36 is secured in recess 30 against wall 32 so that arris 40 is generally aligned with bell mouth 26 but sufficiently "proud" of that surface to cut a shaving from a work piece 50 as further described below.

A bore 52 for receiving bubble level vial 54 is positioned in body 12 so that it intersects the rim 56 of body 12 and has a longitudinal axis parallel to rotational axis 14. Thus, a slot 58 is formed in rim 56 through which the position of a bubble in vial 54 may be observed.

Figure 7:
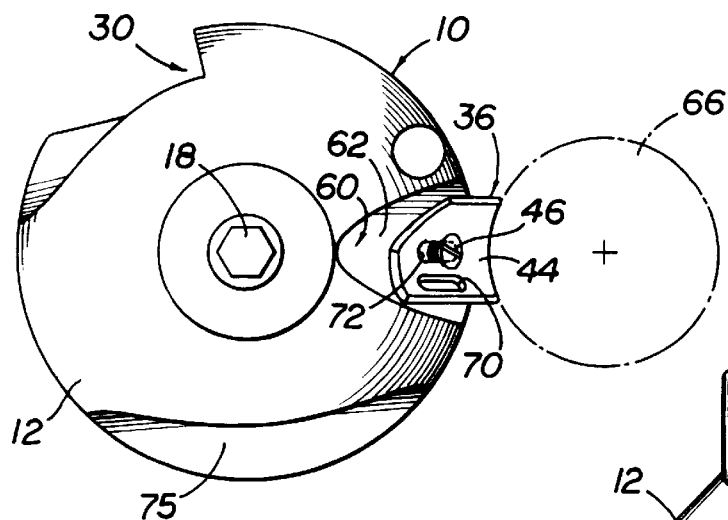
FIG. 7 is an axial view of the tenon cutter of FIG. 1 looking at the shank.
Figure 8:
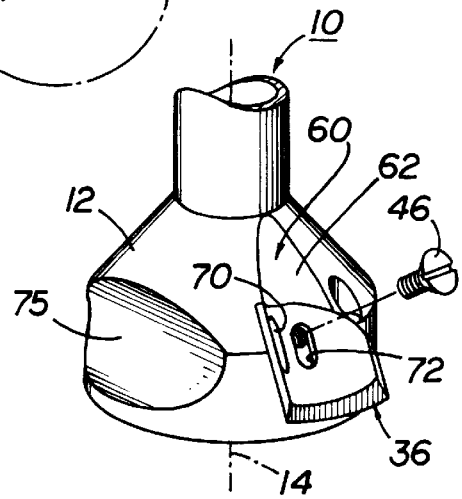
FIG. 8 is a perspective view of the FIG. 1 tenon cutter body with the cutter blade shown positioned for sharpening against a sanding drum.
Figure 9:
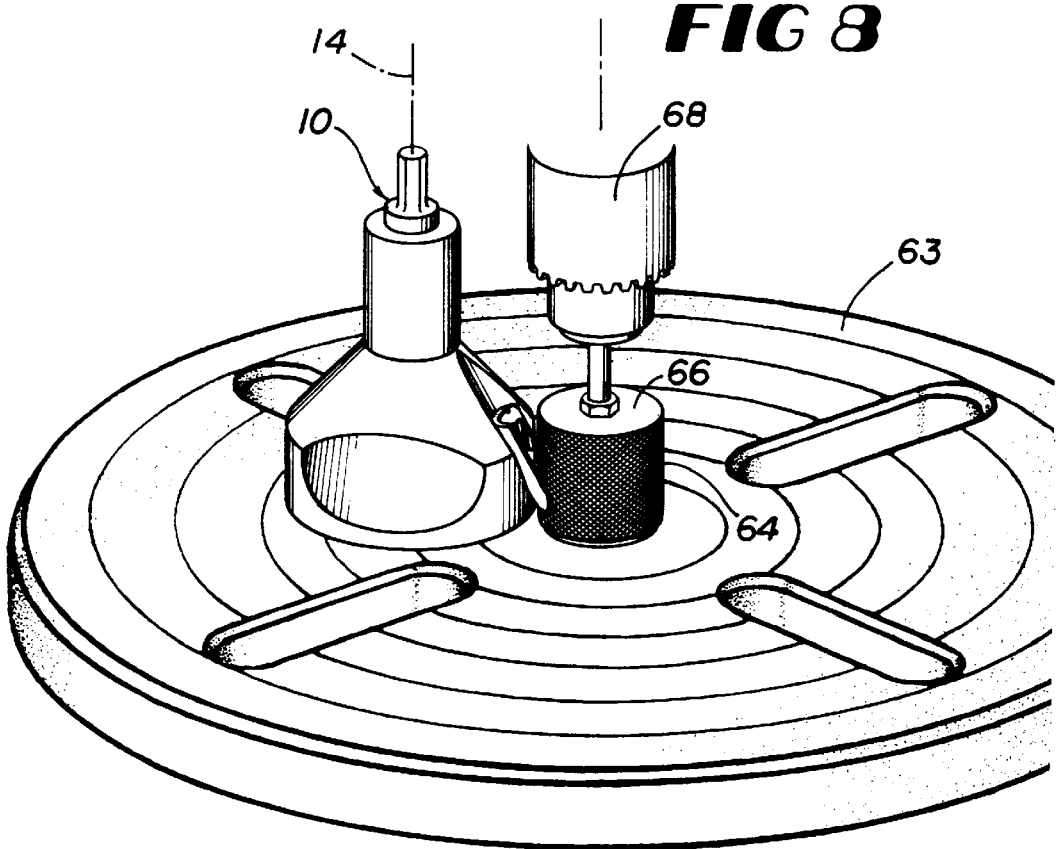
FIG. 9 is a perspective view showing sharpening of the cutter blade using a drill press.

As will be appreciated by reference to FIGS. 7, 8 and 9, blade 36 may be repositioned for sharpening in a second recess 60 in a body 12 having a curved surface 62 matching the convex side 38 of blade 36. Recess 60 is positioned so that blade 38 may be secured within it with screw 46 so that, as may be appreciated by reference to FIGS. 7, 8 and 9, bevel 42 lies against the surface of a sanding drum 66 positioned as indicated by the broken circle in FIG. 7 having an axis of rotation parallel to the rotational axis 14 of tenon cutter 10.

As is illustrated in FIG. 9, this permits blade 36 to be sharpened by resting the face 20 of body 12 on a drill press table 63 in a position that permits bevel 42 of blade 36 to contact the working surface 64 of a sanding drum 66 positioned in the chuck 68 of a drill press (not otherwise illustrated).

Another recess 75 in body 12 removes or omits sufficient material from body 12 to balance it about rotating axis 14 when cutter blade 36 is positioned in recess 30. Balancing tenon cutter 10 reduces rotational vibration, with a consequent improvement in safety to the user and the quality of tenon that may be formed. Balancing can be achieved using conventional dynamic balancing procedures or using computer aided design (CAD) mass properties analysis design tools.

As will be appreciated by reference to FIGS. 2 and 3, and comparison to FIG. 8, cutter blade 36 is secured in recess 30 by passing screw 46 through a washer 48 with a curved face for contact with blade 36 concave surface 44 and then through a first oval slot 70 in blade 36 and into threaded bore 61 in body 12.

Blade 36 is secured in recess 60 for sharpening by passing screw 46 through a second, more centrally located, oval slot 72 in blade 36 positioning the blade 36 at bevel angle 79 (which angle may vary but typically is preferably about 30 degrees). The oval shapes of both of slots 70 and 72 permit cutting arris 40 on blade 36 to be advanced or retracted as necessary in order to appropriately position the blade in either recess 30 or 60 for tenon-formation or blade sharpening, respectively. Securing means other than screw 46, such as a clip or clamp engaging blade 36, could also be used to adjustably fix blade 36 in position in recess 30 or recess 60. A stop screw 74 is located in a threaded hole 80 just below the surface 32 of recess 30 in body 12 so that the back edge 76 of blade 36 contacts the head of screw 74, which thereby acts as a stop. Optionally, a washer may be placed under the head of screw 74 to create a larger stop. Fractional rotations of screw 74 will thus permit or result in very small, easily controlled advances or retractions of cutter blade 36.

Within a narrow range, such tangential advances and retractions of cutter blade 36 will cause formation of smaller and larger diameters, respectively, of tenons 24 as arris 40 projects a greater or lesser distance into bore 22. It is desirable, however, for arris 40 to be positioned near the point of tangency relative to bore 22; as cutter blade 36 is retracted, arris 40 tends to assume a scraping orientation relative to the work piece rather than the cutting or slicing action that is preferred. Further increases in the diameter of tenon 34 produced on work piece 50 (within the limit of the diameter of bore 22) may be achieved by placing a thin shim 77 (produced for instance, from machinist's brass shim stock) between cutter blade 36 and surface 32 of recess 30. This increases the diameter of tenon 24 produced while maintaining arris 40 near the point of tangency, thereby preserving a cutting or slicing action, rather than a scraping action. For instance, a strip approximately ⅛ inch wide of 0.010 inch thick brass or other shim stock 77 (see FIG. 3) may be placed between the blade 36 and body 12 surface 32 in the vicinity of point "X" on FIGS. 3 and 6 (This will change the radial position of the portion of arris 40 that shaves tenon 24 to its final diameter by as much 0.010 inch (depending on shim 77 location), which will increase tenon diameter by approximately 0.020 inches. Among other alternatives to shim 77, portions of cutter blade 36 could also be lifted from surface 32 of recess 30 by adjusting the projection of one or more set screws positioned in threaded bores penetrating surface 32.

Figure 6:
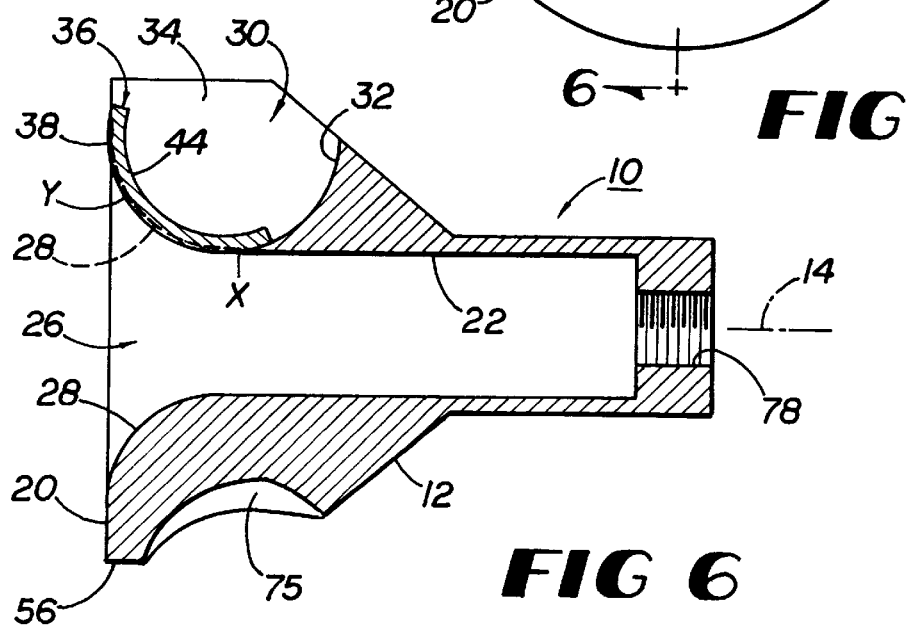
FIG. 6 is a side elevation view of the tenon cutter of FIG. 1 taken along line 6—6 in FIG. 5.

Reduction in the thickness of the shaving removed from work piece 50 at shoulder 51 (FIG. 1) may be achieved by placing a similar shim 77 between cutter blade 36 and surface 32 near the face 20 of the body 12, i.e., near position "Y" shown on FIGS. 3 and 6. Thinner shavings generally produce a smoother tenon 24 and shoulder 51 surface. Such reduction in the projection of arris 40 of blade 36 proximate the face 20 also reduces the torque required to turn tenon cutter 10 around a particular work piece 50 and reduces the tendency for cutter 10 to be thrown off-axis when starting tenon formation on a large diameter work piece.

Although the above-described adjustments are often desirable, generally arris 40 should project beyond the surface of bell mouth 26 in the vicinity of face 20 approximately 0.03 to 0.04 inch, and arris 40 (when it lies on the imaginary projected surface 32) should project into the bore 22 approximately 0.01 inch. Expressed differently, the surface 32, if projected through bore 22, should be separated by approximately 0.01 inch from the nearest point on the wall of bore 22 (or the surface on which the wall of bore 22 would lie if there were no recess 30). This geometry results in a shaving that is thicker on its shoulder 51 side and reduces in thickness across its width so that it is very thin on its tenon 24 side, with the result that a very smooth tenon surface is produced.

As will be appreciated by reference to FIGS. 10–12, in an alternative embodiment, a tenon cutter 90 may be manufactured in accordance with the present invention having a body 92 with a generally square cross section made of wood (e.g., maple) or other material. Such a tenon cutter 90 is generally functionally identical to the tenon cutter 10 described above in almost every respect, except that shank 94 to be received in a brace or shank 98 for an electric drill motor is not attached to body 92 by receiving it in a hole such as shank hole 78 in body 12. Instead, shank 94 or 98 is welded or otherwise secure to a bracket 96 that is in turn secured to body 92.

Additionally, since sides of body 92 are flat, body 92 can rest on side 102 while cutter blade 36 is positioned in recess 100 for sharpening cutter blade 36 against a cylindrical abrasive surface.

Regardless of the material from which body 12 or 92 is produced, which may include composite materials such as fiber reinforced polymers and various metals and metal alloys, among others, the quality of surface produced on tenon 24 and the adjacent shoulder will be a function, in part, of the shape of the cross-section of the bell mouth and, concomitantly, the shape of the cutter blade 36. While a wide variety of different shapes may be used, including ones other than constant curves, such as elliptical segments, the preferred shape is a constant curve (i.e., a segment of a circle) and a preferred radius is approximately 0.75 inch. Such a relatively large radius 28 facilitates the transition from a relatively thick cut or shaving taken high on the shoulder 51 to a relatively thinner cut and shaving forming the final diameter of tenon 24. Such a radius also permits a tenon to be formed on a work piece substantially larger in diameter (on the order, for instance, of approximately 1.5 inches larger) than the tenon diameter.

As will be appreciated by those skilled in the art, the same radius of curvature 28 of the bell mouth and cutter blade 36 may be used for different tenon cutters 10 and 90 that form different nominal diameters of tenons 24. In addition to the manufacturing and blade 36 grinding and sharpening simplicity contributed by this uniformity, such uniformity results in uniform-looking shoulders on all tenons in a particular piece of furniture, even though different diameter tenons are utilized. Typical nominal diameters that may be formed utilizing the tenon cutters 10 and 90 of the present invention are ⅝ inch, ⅞ inch and 1 inch, although many other diameters are possible.

As will be readily understood by reference to the forgoing description, the accompanying drawings and following claims, numerous other modifications can be made in the tenon cutter of the present invention without departing from the spirit of the present invention or the scope of the following claims.

We claim:

1. Apparatus for forming a cylindrical section on a wooden work piece, comprising:

a body having an axis of rotation, a face penetrated by a cylindrical bore centered on the axis of rotation and a bell-shaped mouth transitioning from the face to the bore, means for rotating the body and work piece relative to each other about the axis of rotation, a cutter blade having a bevel, and means for attaching the cutter blade to the body in a first, cutting position adjacent to the bell mouth and in a second, sharpening position presenting the bevel for contact with a cylindrical abrasive surface.

2. A tenon cutter comprising:

a body having a face penetrated by a cylindrical bore centered on an axis of rotation and a bell-shaped mouth transitioning from the bore to the face, the surface of the mouth defined by rotating a curve about the axis of rotation, a shank for rotating the body about the axis of rotation, for attachment to the body, a cutter blade having a cutting arris substantially matching the curve, means for positioning the cutting blade in a first position with the arris adjacent to the bell mouth and adjusting the blade position tangentially relative to the axis of rotation of the tenon cutter, and additional, separate means for adjusting the position of the cutter blade by moving at least a portion of the blade generally radially relative to the axis of rotation of the tenon cutter.

3. The tenon cutter of claim 2, further comprising a stop for establishing the tangential position of the cutter.

4. The tenon cutter of claim 3, wherein the stop comprises a head of a threaded screw received in a threaded bore in the body.

5. The tenon cutter of claim 2, wherein the shape of the curve is approximately 90 degrees of circular arc.

6. The tenon cutter of claim 5, wherein the radius of the curve is approximately 0.75 inch.

7. The tenon cutter of claim 2, further comprising means attached to the body for determining orientation of the tenon cutter relative to horizontal.

8. The tenon cutter of claim 2, further comprising a bubble-level vial attached to the body to indicate when the axis of rotation of the tenon cutter is horizontal.

9. The tenon cutter of claim 2, wherein the body comprises aluminum.

10. The tenon cutter of claim 9, wherein the aluminum body is anodized.

11. The tenon cutter of claim 2, wherein the body comprises wood.

12. The tenon cutter of claim 2, wherein the shank comprises a rod having a hexagonal cross-section.

13. The tenon cutter of claim 2, wherein the shank is adapted to be received within a bit brace.

14. The tenon cutter of claim 2, wherein the body is wood and the shank is adapted to be received within a bit brace.

15. The tenon cutter of claim 2, wherein the tenon cutter is rotationally balanced to permit rotation at a relatively high speed without appreciable wobble.

16. The tenon cutter of claim 2, wherein the cutting blade has a convex surface and a bevel intersecting the convex surface at approximately 30°.

17. The tenon cutter of claim 5, wherein the cutter blade has a convex, semi-cylindrical surface having a radius of curvature and the body is penetrated by a recess for receiving the cutter blade, which recess is generally defined by:

a semi-cylindrical concave surface having a radius of curvature substantially equal to the radius of curvature of the cutter blade convex surface and a planar wall parallel to and offset from an imaginary plane that includes the axis of rotation.

18. The tenon cutter of claim 17, wherein the planar wall is offset from the imaginary plane by approximately 0.070 inch.

19. The tenon cutter of claim 17, wherein the bore in the body is defined by a cylindrical bore wall, and the semi-cylindrical concave surface, if projected into the bore, is closest to the axis of rotation at a point slightly inside the bore wall.

20. The tenon cutter of claim 18, wherein the distance between the projected surface point closest to the axis of rotation and the nearest portion of the bore wall is approximately 0.01 inch.

21. A tenon cutter comprising:

a body having a face penetrated by a cylindrical bore centered on an axis of rotation and a bell-shaped mouth transitioning from the bore to the face, the surface of the mouth defined by rotating a curve about the axis of rotation, a shank for rotating the body about the axis of rotation, for attachment to the body, a cutter blade having a cutting arris substantially matching the curve, means for adjustably positioning the cutting blade in a first position with the arris adjacent to the bell mouth, and means for positioning the cutter on the body in a second position for sharpening the cutter using a rotating cylindrical abrasive surface.

22. A tenon cutter comprising:

a body having a face penetrated by a cylindrical bore centered on an axis of rotation and a bell-shaped mouth transitioning from the bore to the face, the surface of the mouth defined by rotating a curve about the axis of rotation, a shank for rotating the body about the axis of rotation, for attachment to the body, a cutter blade having a cutting arris substantially matching the curve, and means for adjustably positioning the cutting blade in a first position with the arris adjacent to the bell mouth, wherein the means for adjusting comprises a shim for positioning between the cutter blade and the body.

23. A tenon cutter comprising:

a body having a face penetrated by a cylindrical bore centered on an axis of rotation and a bell-shaped mouth transitioning from the bore to the face, the surface of the mouth defined by rotating a curve about the axis of rotation, a shank for rotating the body about the axis of rotation, for attachment to the body, a cutter blade having a cutting arris substantially matching the curve, wherein the cutter blade may be sharpened by repositioning the cutter on the body while the body rests on a surface positioned normal to the axis of rotation of a cylindrical abrasive surface, and means for adjustably positioning the cutting blade in a first position with the arris adjacent to the bell mouth.

24. A tenon cutter comprising:

an anodized aluminum body having a face penetrated by a cylindrical, blind bore centered on an axis of rotation and a bell-shaped mouth transitioning from the bore to the face, the surface of the mouth defined by rotating an approximately 90 degree segment of a circle having a radius of about 0.75 inch about the axis of rotation, a shank attached to the body coaxial with the axis of rotation for rotating the body about the axis of rotation using an electric drill motor, for attachment to the body, a semi-cylindrical cutter blade penetrated by at least one hole and having a concave side and a cutting arris formed by a bevel on the concave side of the blade, the arris having a radius substantially matching the circle radius, and a screw for passing through the hole in the blade and into the body for positioning the cutting blade in a first, cutting position with the arris adjacent to the bell mouth and in a second, sharpening position for contact with an abrasive surface, a level secured in the body to indicate when the axis of rotation is horizontal.

25. A method for forming a cylindrical tenon having a cylindrical axis on a wooden work piece having a longitudinal axis, with the cylindrical axis of the tenon offset from the work piece longitudinal axis, comprising the steps of:

a) securing the work piece with the longitudinal axis offset from horizontal so that the cylindrical axis of the desired tenon to be formed on the work piece is horizontal;

b) orienting a tenon cutter having a means for accurately determining orientation of the tenon cutter relative to horizontal in a position so that the tenon cutter is horizontal;

c) rotating the tenon cutter against the work piece to remove material therefrom and thereby form a cylindrical tenon while maintaining the orientation of the rotational axis of the tenon cutter horizontal.

* * * * *